(12) United States Patent
Archer et al.

(10) Patent No.: US 8,307,243 B2
(45) Date of Patent: Nov. 6, 2012

(54) PARALLEL DEBUGGING IN A MASSIVELY PARALLEL COMPUTING SYSTEM

(75) Inventors: Charles J. Archer, Rochester, MN (US); Todd A. Inglett, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 12/697,721

(22) Filed: Feb. 1, 2010

(65) Prior Publication Data

US 2011/0191633 A1 Aug. 4, 2011

(51) Int. Cl.
*G06F 11/00* (2006.01)

(52) U.S. Cl. ............... 714/20; 714/4.1; 714/11; 714/12; 714/15; 714/43; 714/47.1

(58) Field of Classification Search .................. 714/4.1, 714/11, 12, 15, 20, 26, 31, 37, 43, 45, 47.1
See application file for complete search history.

(56) References Cited

U.S. PATENT DOCUMENTS

| | | | | |
|---|---|---|---|---|
| 5,630,047 A * | 5/1997 | Wang | | 714/15 |
| 5,794,046 A * | 8/1998 | Meier et al. | | 717/128 |
| 5,923,832 A * | 7/1999 | Shirakihara et al. | | 714/37 |
| 5,974,425 A * | 10/1999 | Obermarck et al. | | 707/682 |
| 6,052,799 A * | 4/2000 | Li et al. | | 714/13 |
| 6,643,802 B1 * | 11/2003 | Frost et al. | | 714/37 |
| 6,965,936 B1 * | 11/2005 | Wipfel et al. | | 709/224 |
| 7,065,540 B2 * | 6/2006 | Chandrasekaran et al. | .. | 707/674 |
| 7,096,392 B2 * | 8/2006 | Sim-Tang | | 714/48 |
| 7,197,665 B2 * | 3/2007 | Goldstein et al. | | 714/20 |
| 7,203,863 B2 * | 4/2007 | Pavlik et al. | | 714/15 |
| 7,216,254 B1 * | 5/2007 | Rajan et al. | | 714/20 |
| 7,293,200 B2 * | 11/2007 | Neary et al. | | 714/35 |
| 7,296,039 B2 * | 11/2007 | Chandrasekaran et al. | .. | 711/119 |
| 7,356,734 B2 * | 4/2008 | Ricart et al. | | 714/20 |
| 7,363,537 B1 * | 4/2008 | Svarcas et al. | | 714/15 |
| 7,363,549 B2 * | 4/2008 | Sim-Tang | | 714/48 |
| 7,370,223 B2 * | 5/2008 | Olmstead et al. | | 714/4.11 |
| 7,394,832 B1 * | 7/2008 | Dykstra | | 370/509 |
| 7,478,278 B2 | 1/2009 | Archer et al. | | |
| 7,487,393 B2 | 2/2009 | Archer et al. | | |
| 7,627,783 B2 | 12/2009 | Archer et al. | | |
| 7,930,595 B2 * | 4/2011 | Gooding | | 714/37 |
| 7,954,012 B2 * | 5/2011 | Gooding | | 714/45 |
| 2002/0023129 A1 * | 2/2002 | Hsiao et al. | | 709/205 |
| 2003/0078933 A1 * | 4/2003 | Gara et al. | | 707/100 |
| 2004/0054800 A1 * | 3/2004 | Shah et al. | | 709/231 |
| 2004/0153761 A1 * | 8/2004 | Lee | | 714/15 |
| 2006/0282697 A1 * | 12/2006 | Sim-Tang | | 714/1 |
| 2007/0277056 A1 * | 11/2007 | Varadarajan et al. | | 714/15 |
| 2008/0126445 A1 * | 5/2008 | Michelman | | 707/204 |

* cited by examiner

*Primary Examiner* — Joshua P Lottich
(74) *Attorney, Agent, or Firm* — Martin & Associates, LLC; Bret J. Petersen (57) ABSTRACT

A method and apparatus is described for parallel debugging on the data nodes of a parallel computer system. A data template associated with the debugger can be used as a reference to the common data on the nodes. The application or data contained on the compute nodes diverges from the data template at the service node during the course of program execution, so that pieces of the data are different at each of the nodes at some time of interest. For debugging, the compute nodes search their own memory image for checksum matches with the template and produces new data blocks with checksums that didn't exist in the data template, and a template of references to the original data blocks in the template. Examples herein include an application of the rsync protocol, compression and network broadcast to improve debugging in a massively parallel computer environment.

20 Claims, 7 Drawing Sheets

PARALLEL DEBUGGING IN A MASSIVELY PARALLEL COMPUTING SYSTEM

BACKGROUND OF THE INVENTION

1. Technical Field

This disclosure generally relates to massively parallel computing systems, and more specifically relates to parallel debugging of software executing on a large number of nodes of the massively parallel computer system by gathering a differences of data in the memory of the nodes.

2. Background Art

Supercomputers continue to be developed to tackle sophisticated computing jobs. These computers are particularly useful to scientists for high performance computing (HPC) applications including life sciences, financial modeling, hydrodynamics, quantum chemistry, molecular dynamics, astronomy and space research and climate modeling. Supercomputer developers have focused on massively parallel computer structures to solve this need for increasingly complex computing needs. One such massively parallel computer being developed by International Business Machines Corporation (IBM) is the Blue Gene system. The Blue Gene system is a scalable system with 65,536 or more compute nodes. Each node consists of a single ASIC (application specific integrated circuit) and memory. Each node typically has 512 megabytes of local memory. The full computer is housed in 64 racks or cabinets with 32 node boards in each. Each node board has 32 processors and the associated memory for each processor. As used herein, a massively parallel computer system is a system with more than about 10,000 processor nodes.

The Blue Gene supercomputer's 65,536 computational nodes and 1024 I/O processors are arranged into both a logical tree network and a logical 3-dimensional torus network. Blue Gene can be described as a compute node core with an I/O node surface. Each I/O node handles the input and output function of 64 compute nodes. The I/O nodes are connected to the compute nodes through the tree network and also have functional wide area network capabilities through its built in gigabit ethernet network.

On a massively parallel computer system like Blue Gene, debugging the complex software and hardware has been a monumental task. Prior art systems for parallel debugging are effective for a few thousand nodes, but are unscalable to the number of nodes in massively parallel systems. The typical prior art debugging system requires sending a great deal of data from the compute nodes to a front end node for processing. Sending data to the front end node is inefficient and may overwhelm the front end node resources and the network used for transferring the data.

DISCLOSURE OF INVENTION

A method and apparatus is described for parallel debugging on a massively parallel computer system. A data template is used as a reference to the common data on the nodes for an execution state at some initial state or point in time. Embodiments herein include an application of the rsync protocol, compression and network broadcast to improve debugging in a massively parallel super computer environment. Embodiments herein greatly decrease the amount of data that must be transmitted and stored for increased efficiency and ease of debugging of the computer system.

In the parallel computer system as described herein, the data being debugged at the compute nodes is often identical to or is quite similar with data on the other nodes. The data template is associated with the debugger on a front end system or service node and used as a reference to the common data on the nodes. The data template represents the content of sets of memory, registers, and state of execution of all compute nodes in the cluster at some initial state or point in time. The application or data contained on the compute nodes diverges from the data template at the service node during the course of program execution, so that pieces of the data are different at each of the nodes at some time of interest. Aggregate bandwidth requirements needed to perform debugging can be significantly reduced because redundant information in the debug set is not sent to the compute nodes for comparison. Similarly, significantly less data can be transferred back to the debugger since only new data blocks are needed by the debugger.

The disclosed embodiments are directed to the Blue Gene architecture but can be implemented on any cluster with a high speed interconnect that can perform broadcast communication. The foregoing and other features and advantages will be apparent from the following more particular description, as illustrated in the accompanying drawings.

BRIEF DESCRIPTION OF DRAWINGS

The disclosure will hereinafter be described in conjunction with the appended drawings, where like designations denote like elements, and.

BEST MODE FOR CARRYING OUT THE INVENTION

This disclosure relates to an apparatus and method for parallel debugging on a massively parallel computer system using a parallel variation of the rsync protocol with a rolling checksum algorithm. The rsync Overview section immediately below is intended to provide an explanation of basic rsync concepts.

rsync Overview

Recent developments have been made on a method to save incremental differences of a computer file from one machine to another machine without transmitting an entire memory image from one machine to another. This method is called "rsync". The rsync software and method is open source. Information about rsync is widely available. The rsync method uses an "rsync algorithm" which provides a very fast method for bringing remote files into synchronization. It does this by sending just the differences in the files across the link, without requiring that both sets of files are present at one of the ends of the link beforehand. The rsync algorithm addresses the problem where the prior methods for creating a set of differences between two files relied on being able to read both files on the same machine.

The rsync algorithm can be stated as follows: Given two computers a and b. Computer a has access to a file A and computer b has access to file B, where files A and B are "similar" and there is a relatively slow communications link between a and b. The rsync algorithm consists of the following steps:

1. Computer b splits the file B into a series of non-overlapping fixed-sized blocks of size S bytes. The last block may be shorter than S bytes.
2. For each of these blocks b calculates two checksums: a weak "rolling" 32-bit checksum (described below) and a strong 128-bit MD4 checksum.
3. b sends these checksums to a.
4. a searches through A to find all blocks of length S bytes (at any offset, not just multiples of S) that have the same weak and strong checksum as one of the blocks of B. This can be done in a single pass very quickly using a special property of the rolling checksum described below.
5. a sends b a sequence of instructions for constructing a copy of A. Each instruction is either a reference to a block of B, or literal data. Literal data is sent only for those sections of A which did not match any of the blocks of B.
6. Computer b writes an updated file by interpreting the instructions received in step 5. The result is an identical copy of file A.

The end result is that B gets a copy of A, but only the pieces of A that are not found in B (plus a small amount of data for checksums and block indexes) are sent over the link. The algorithm also only requires one round trip, which minimizes the impact of the link latency. An important aspect of the algorithm is the rolling checksum and the associated multi-alternate search mechanism which allows the all-offsets checksum search to proceed very quickly. Further details of the rolling checksum and search mechanism are widely available on the internet and are not described in detail herein.

DETAILED DESCRIPTION

In this disclosure, a method and apparatus is described for parallel debugging on a massively parallel computer system. In the parallel computer system as described herein, the data being debugged at the compute nodes is often identical to or is quite similar with data on the other nodes. A data template associated with the debugger can be used as a reference to the common data on the nodes. The data template represents the content of sets of memory, registers, and state of execution of all compute nodes in the cluster at some initial state or some execution state. The application or data contained on the compute nodes diverges from the data template at the service node during the course of program execution, so that pieces of the data are different at each of the nodes at some time of interest. For debugging, the compute nodes search their own memory image for checksum matches with the template and produces new data blocks with checksums that didn't exist in the data template, and a template of references to the original data blocks in the template. Embodiments herein include an application of the rsync protocol, compression and network broadcast to improve debugging in a massively parallel computer environment. Embodiments herein greatly decrease the amount of data that must be transmitted and stored for increased efficiency and ease of debugging of the computer system. Further, the data blocks may be compressed using conventional non-lossy data compression algorithms to further reduce the overall debug set size.

The disclosure herein makes use of the broadcast features of the network and the aggregation capabilities of the root of the multicast system such as those available on the I/O nodes of Blue Gene/L computer system to increase the efficiency of debugging. Further, a modified rsync protocol may be used to reduce computation and memory requirements at the compute nodes by not having local copies of the template and different data. Aggregate bandwidth requirements needed to perform debugging can be significantly reduced because redundant information in a set of compute nodes is saved as a data template and is not sent to the compute nodes for comparison. Similarly, significantly less data can be transferred back to the debugger since only new data blocks are needed by the debugger.

Figure 1:
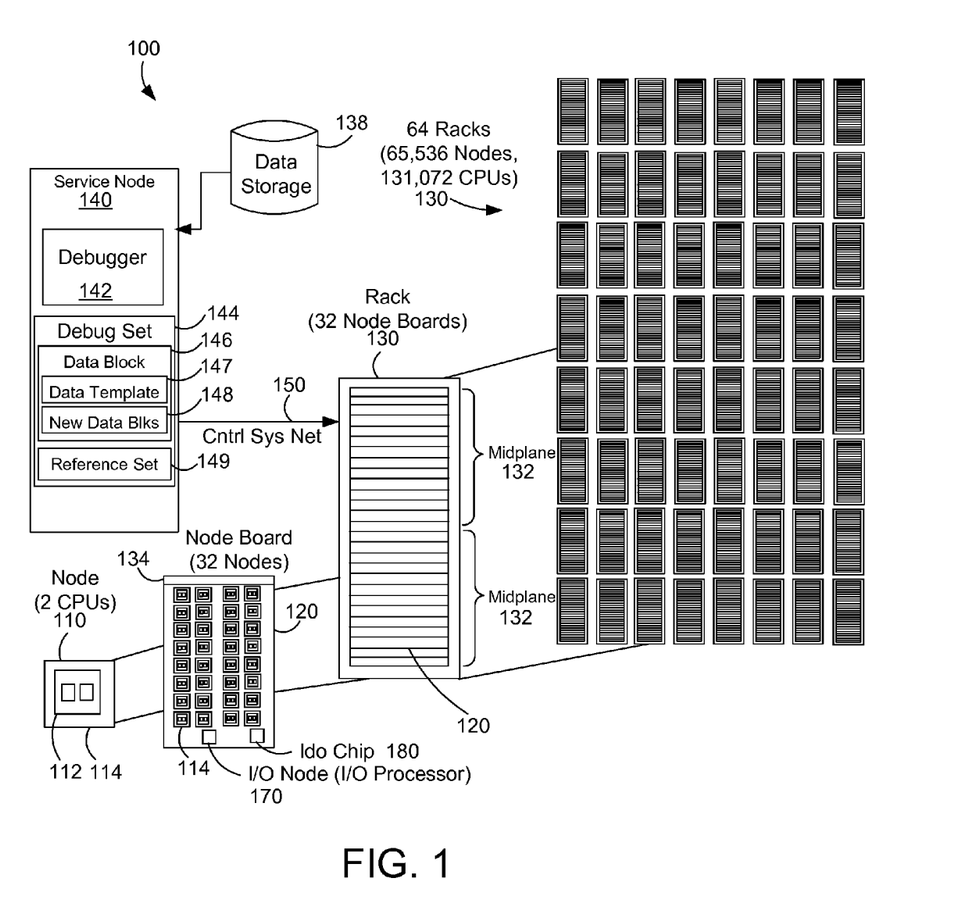
FIG. 1 is a block diagram of a computer system according to preferred embodiments.

FIG. 1 shows a block diagram that represents a massively parallel computer system 100 such as the Blue Gene/L computer system. The Blue Gene/L system is a scalable system in which the maximum number of compute nodes is 65,536. Each node 110 has an application specific integrated circuit (ASIC) 112, also called a Blue Gene/L compute chip 112. The compute chip incorporates two processors or central processor units (CPUs) and is mounted on a node daughter card 114. The node also typically has 512 megabytes of local memory (not shown). A node board 120 accommodates 32 node daughter cards 114 each having a node 110. Thus, each node board has 32 nodes, with 2 processors for each node, and the associated memory for each processor. A rack 130 is a housing that contains 32 node boards 120. Each of the node boards 120 connect into a midplane printed circuit board 132 with a midplane connector 134. The midplane 132 is inside the rack and not shown in FIG. 1. The full Blue Gene/L computer system would be housed in 64 racks 130 or cabinets with 32 node boards 120 in each. The full system would then have 65,536 nodes and 131,072 CPUs (64 racks×32 node boards× 32 nodes×2 CPUs).

The Blue Gene/L computer system structure can be described as a compute node core with an I/O node surface, where communication to 1024 compute nodes 110 is handled by each I/O node 170 that has an I/O processor connected to the service node 140. The I/O nodes 170 have no local storage. The I/O nodes are connected to the compute nodes through the logical tree network and also have functional wide area network capabilities through a gigabit Ethernet network (See FIG. 2 below). The gigabit Ethernet network is connected to an I/O processor (or Blue Gene/L link chip) in the I/O node 170 located on a node board 120 that handles communication from the service node 160 to a number of nodes. The Blue Gene/L system has one or more I/O nodes 170 connected to the node board 120. The I/O processors can be configured to communicate with 8, 32 or 64 nodes. The service node uses the gigabit network to control connectivity by communicating to link cards on the compute nodes. The connections to the I/O nodes are similar to the connections to the compute node except the I/O nodes are not connected to the torus network.

Again referring to FIG. 1, the computer system 100 includes a service node 140 that handles the loading of the nodes with software and controls the operation of the whole system. The service node 140 is typically a mini computer system such as an IBM pSeries server running Linux with a control console (not shown). The service node 140 is connected to the racks 130 of compute nodes 110 with a control system network 150. The control system network provides control, test, and bring-up infrastructure for the Blue Gene/L system. The control system network 150 includes various network interfaces that provide the necessary communication for the massively parallel computer system. The network interfaces are described further below. In the Blue/Gene/L system there may also be a number of front end nodes that are similar to the service node 140. As used herein, the term service node includes these other front end nodes.

The service node 140 communicates through the control system network 150 dedicated to system management. The control system network 150 includes a private 100-Mb/s Ethernet connected to an Ido chip 180 located on a node board 120 that handles communication from the service node 160 to a number of nodes. This network is sometime referred to as the JTAG network since it communicates using the JTAG protocol. All control, test, and bring-up of the compute nodes 110 on the node board 120 is governed through the JTAG port communicating with the service node.

The service node includes a debugger 142 that provides tools for assisting the user in troubleshooting software executing on the compute nodes. Alternatively, the debugger 142 may also reside on a front end node or on another node of the system. In conjunction with the debugger 142, the service node 140 also has a debug set 144 that includes a data block set 146 and a reference set 149. The data block set 146 includes data blocks along with the corresponding checksums for each of the data blocks. The data block set 146 includes a data template 147 and new data blocks 148. The data template 147 is a reference set of data blocks that represent the content of memory, registers, and state of execution of all compute nodes in the cluster at some initial state or point in time. Later, the data block set also includes new data blocks 148 received from the nodes as described below. The reference set 149 includes a set of references for each node in the system, where the set of references for each node includes a list of references to the data blocks in the data block set such that if the actual data blocks were collected together in order they would represent the data of that node. The debugger may not always need to directly access the actual data blocks, so the data of the debug set 144 may also be stored on an auxiliary disk or high speed database as represented by data storage 138. The debug set 144 is described further with reference to FIG. 4.

Figure 2:
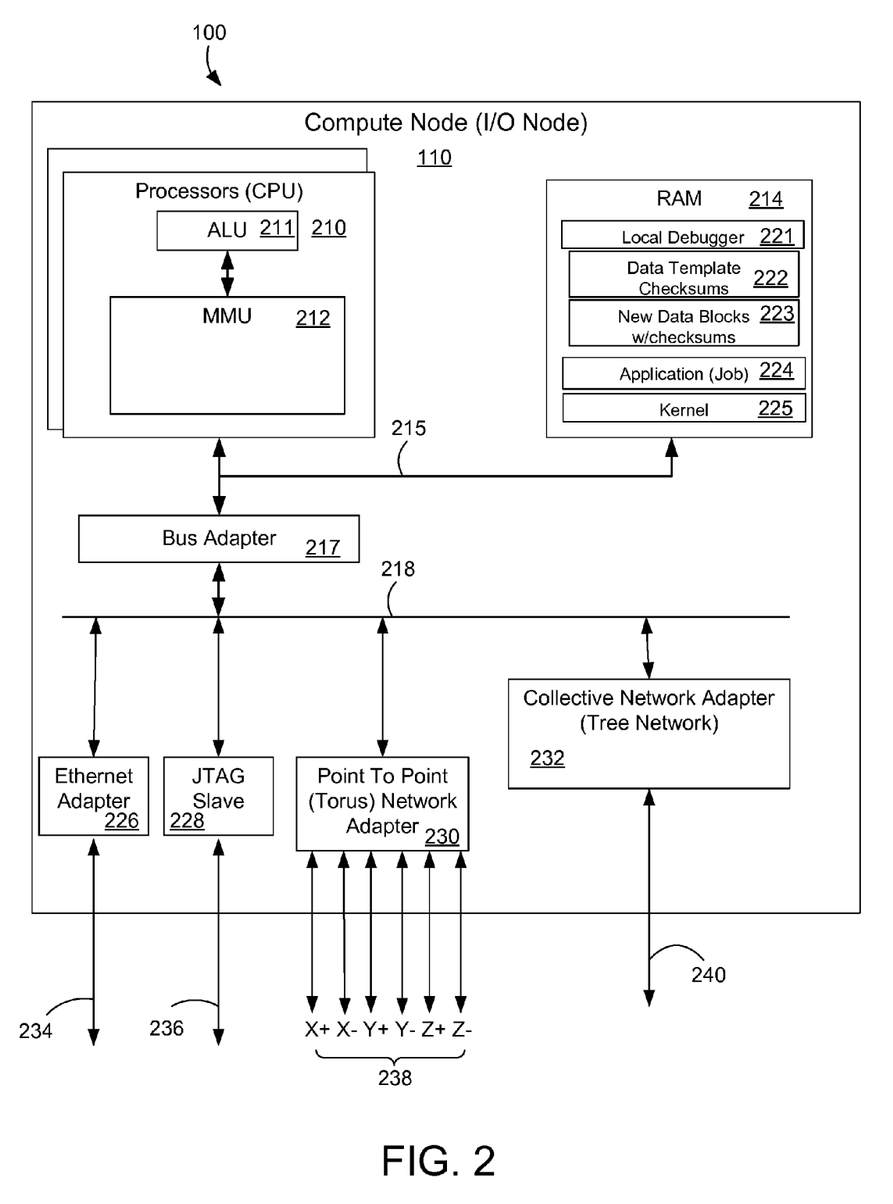
FIG. 2 is a block diagram of a single node of a massively parallel computer system according to preferred embodiments.

FIG. 2 illustrates a block diagram of an exemplary compute node as introduced above. FIG. 2 also represents a block diagram for an I/O node, which has the same overall structure as the compute node. A notable difference between the compute node and the I/O nodes is that the Ethernet adapter 226 is connected to the control system on the I/O node but is not used in the compute node. The compute node 110 of FIG. 2 includes a plurality of computer processors 210, each with an arithmetic logic unit (ALU) 211 and a memory management unit (MMU) 212. The processors 210 are connected to random access memory ('RAM') 214 through a high-speed memory bus 215. Also connected to the high-speed memory bus 214 is a bus adapter 217. The bus adapter 217 connects to an extension bus 218 that connects to other components of the compute node.

Stored in RAM 214 is a local debugger 221, data template checksums 222, new data blocks with checksums 223, an application program (or job) 224, and an operating system kernel 225. The data template checksums 222 are the checksums of the data template 147 described with reference to FIG. 1. The new data blocks with checksums 223 are data blocks identified while comparing data on the compute nodes with the data template as described further below. The application program is loaded on the node by the control system to perform a user designated task. The application program typically runs in parallel with application programs running on adjacent nodes. The operating system kernel 225 is a module of computer program instructions and routines for an application program's access to other resources of the compute node. The quantity and complexity of tasks to be performed by an operating system on a compute node in a massively parallel computer are typically smaller and less complex than those of an operating system on a typical stand alone computer. The operating system may therefore be quite lightweight by comparison with operating systems of general purpose computers, a pared down version as it were, or an operating system developed specifically for operations on a particular massively parallel computer. Operating systems that may usefully be improved, simplified, for use in a compute node include UNIX, Linux, Microsoft XP, AIX, IBM's i5/OS, and others as will occur to those of skill in the art.

The compute node 110 of FIG. 2 includes several communications adapters 226, 228, 230, 232 for implementing data communications with other nodes of a massively parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network.

The data communications adapters in the example of FIG. 2 include a Gigabit Ethernet adapter 226 that couples example I/O node 110 for data communications to a Gigabit Ethernet 234. In Blue Gene, this communication link is only used on I/O nodes and is not connected on the compute nodes. Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit 228 that couples the compute node 110 for data communications to a JTAG Master circuit over a JTAG network 236. JTAG is the usual name used for the IEEE 1149.1 standard entitled Standard Test Access Port and Boundary-Scan Architecture for test access ports used for testing printed circuit boards using boundary scan. JTAG boundary scans through JTAG Slave 236 may efficiently configure processor registers and memory in compute node 110.

The data communications adapters in the example of FIG. 2 include a Point To Point Network Adapter 230 that couples the compute node 110 for data communications to a network 238. In Blue Gene, the Point To Point Network is typically configured as a three-dimensional torus or mesh. Point To Point Adapter 230 provides data communications in six directions on three communications axes, x, y, and z, through six bidirectional links 238: +x, −x, +y, −y, +z, and −z. The torus network logically connects the compute nodes in a lattice like structure that allows each compute node 110 to communicate with its closest 6 neighbors.

The data communications adapters in the example of FIG. 2 include a collective network or tree network adapter 232 that couples the compute node 110 for data communications to a network 240 configured as a binary tree. This network is also sometimes referred to as the collective network. Collective network adapter 232 provides data communications through three bidirectional links: two links to children nodes and one link to a parent node (not shown). The collective network adapter 232 of each node has additional hardware to support operations on the collective network.

Again referring to FIG. 2, the collective network 240 extends over the compute nodes of the entire Blue Gene machine, allowing data to be sent from any node to all others (broadcast), or a subset of nodes. Each node typically has three links, with one or two links to a child node and a third connected to a parent node. Arithmetic and logical hardware is built into the collective network to support integer reduction operations including min, max, sum, bitwise logical OR, bitwise logical AND, and bitwise logical XOR. The collective network is also used for global broadcast of data, rather than transmitting it around in rings on the torus network. For one-to-all communications, this is a tremendous improvement from a software point of view over the nearest-neighbor 3D torus network.

Figure 3:
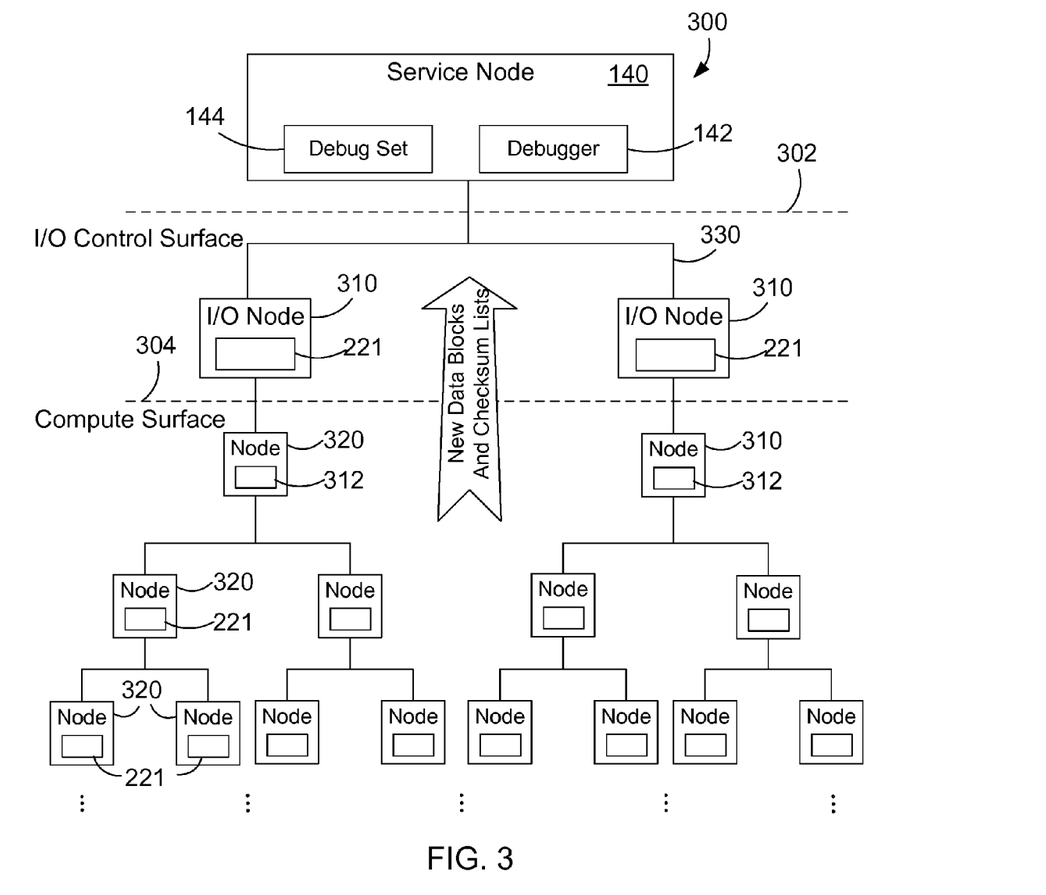
FIG. 3 is a block diagram of a computer system according to preferred embodiments that show the hierarchal structure of the computer system.

FIG. 3 shows a block diagram that represents the massively parallel computer system (100 in FIG. 1) arranged in a logical tree network 300. The logical tree network 300 has a tree structure of I/O nodes 310 and compute nodes 320 that incorporate parallel debugging as described herein. Each of the I/O nodes 310 and the compute nodes 320 preferably have a local debugger 221 that performs the local debug actions as described below. The overall computer system structure is the same as that described above with reference to FIG. 1. The compute nodes 320 in the cluster are organized into a tree hierarchy as shown. The top of the logical tree network is a service node 140 connected to the computer at an I/O control surface 302 of the computer. The debugger 142 is located in the service node 140 at the topmost node of the tree hierarchy. The debugger 142 is connected to the I/O nodes 310 of the computer system 300 in a tree network. Each of the I/O nodes 310 is connected to a first compute node 320 at the compute surface 304 of the computer. Each compute node 320 except for the last level (not shown) may have one or two children nodes in a tree structure. The nodes are shown with a balanced tree with two children each for simplicity. Each I/O node has 64 compute nodes in the tree. In the Blue Gene computer system, one of the communication links 330 that connects the debugger 142 to the nodes of the massively parallel computer system 300 is essentially a standard ethernet network connection.

In the parallel computer system as described herein, the data being debugged at the compute nodes is often identical to or is quite similar with data on the other nodes. A debug set is a template of data that resides with the debugger on a front end system or service node can be used as a reference to the common data on all the nodes. The debug set represents the content of sets of memory, registers, and state of execution of all compute nodes in the cluster at some initial state or point in time. The debug set could be produced from an application binary, memory dump or previous debug set of the application being run. For each node in the system the debug set contains a list of references to these data blocks such that if the actual data blocks were collected together in order they would represent the debug set of that node. Since there is much commonality to the content between the nodes in the system the list of references between any pair of nodes will contain much overlap of actual data blocks. Thus, the actual pool of data blocks will be significantly smaller in size than the sum total of memory in the cluster. Further, the data blocks may be compressed using conventional non-lossy data compression algorithms to further reduce the overall debug set size. The application or data contained on the compute nodes diverges from the template debug set at the compute nodes during the course of program execution, so that pieces of the data are different at each of the nodes at some time of interest. Commonality between the original memory image still exists for much of the image. The disclosure herein leverages the broadcast features of the network and the aggregation capabilities of the root of the multicast system such as those available on the I/O nodes of Blue Gene/L computer system. Further, a modified rsync protocol may be used to reduce computation and memory requirements at the compute nodes by not having local copies of the template and different data. Aggregate bandwidth requirements needed to perform debugging can be significantly reduced because redundant information in a set of compute nodes is saved as a debug set and is not sent to the compute nodes for comparison. Similarly, significantly less data can be transferred back to the debugger since only new data blocks are needed by the debugger.

Figure 4:
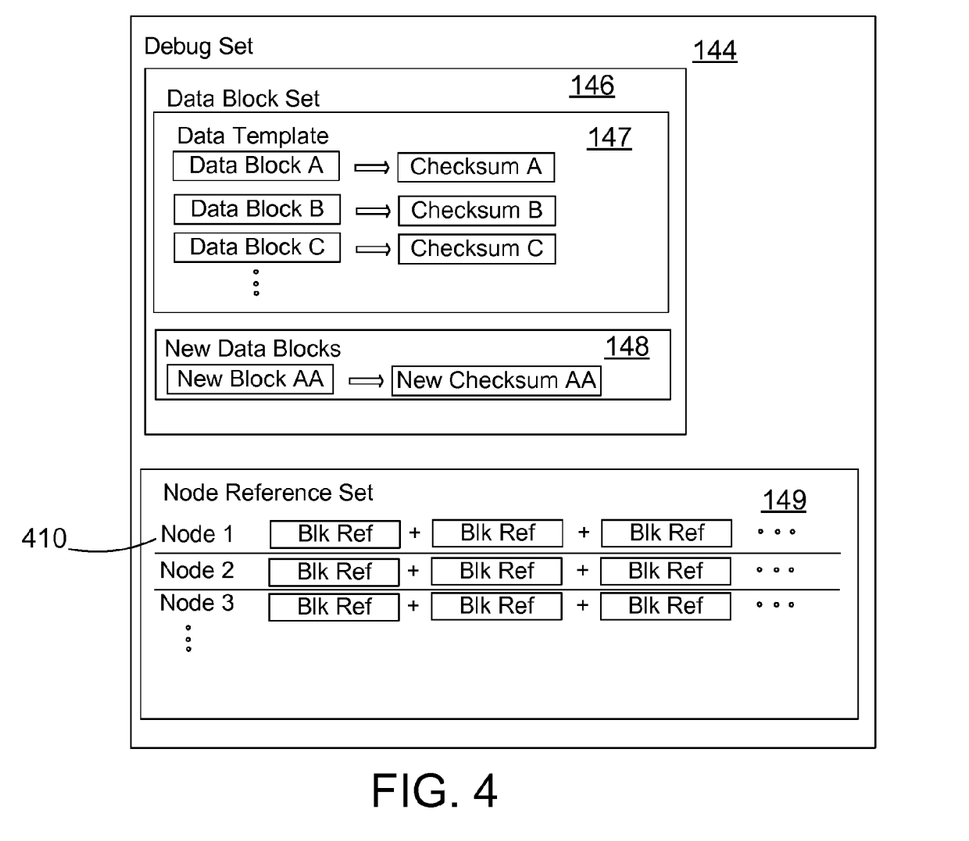
FIG. 4 is a block diagram of a debug set stored in the service node according to preferred embodiments.

FIG. 4 shows a block diagram of the debug set 144 introduced with reference to FIG. 1. The debug set 144 includes data needed by the debugger 142 as described herein. The debug set 144 includes a data block set 146 and a reference set 149. The data block set 146 includes data blocks along with the corresponding checksums for each of the data blocks. The data block set 146 includes a data template 147 and new data blocks 148. The data template 147 is a reference set of data blocks that represent the content of memory, registers, and state of execution of all compute nodes in the cluster at some initial state or point in time. Additional new data blocks 148 are added later as received from the nodes during the debug process as described below. The debug set 144 further includes a reference set 149. The reference set 149 includes a node reference set 410 for each node in the system, where the node reference set 410 for each node is a list of links or pointers to the data blocks for the corresponding node in the data block set such that if the actual data blocks in the nodes reference were collected together in order they would represent the data of that node.

Figure 5:
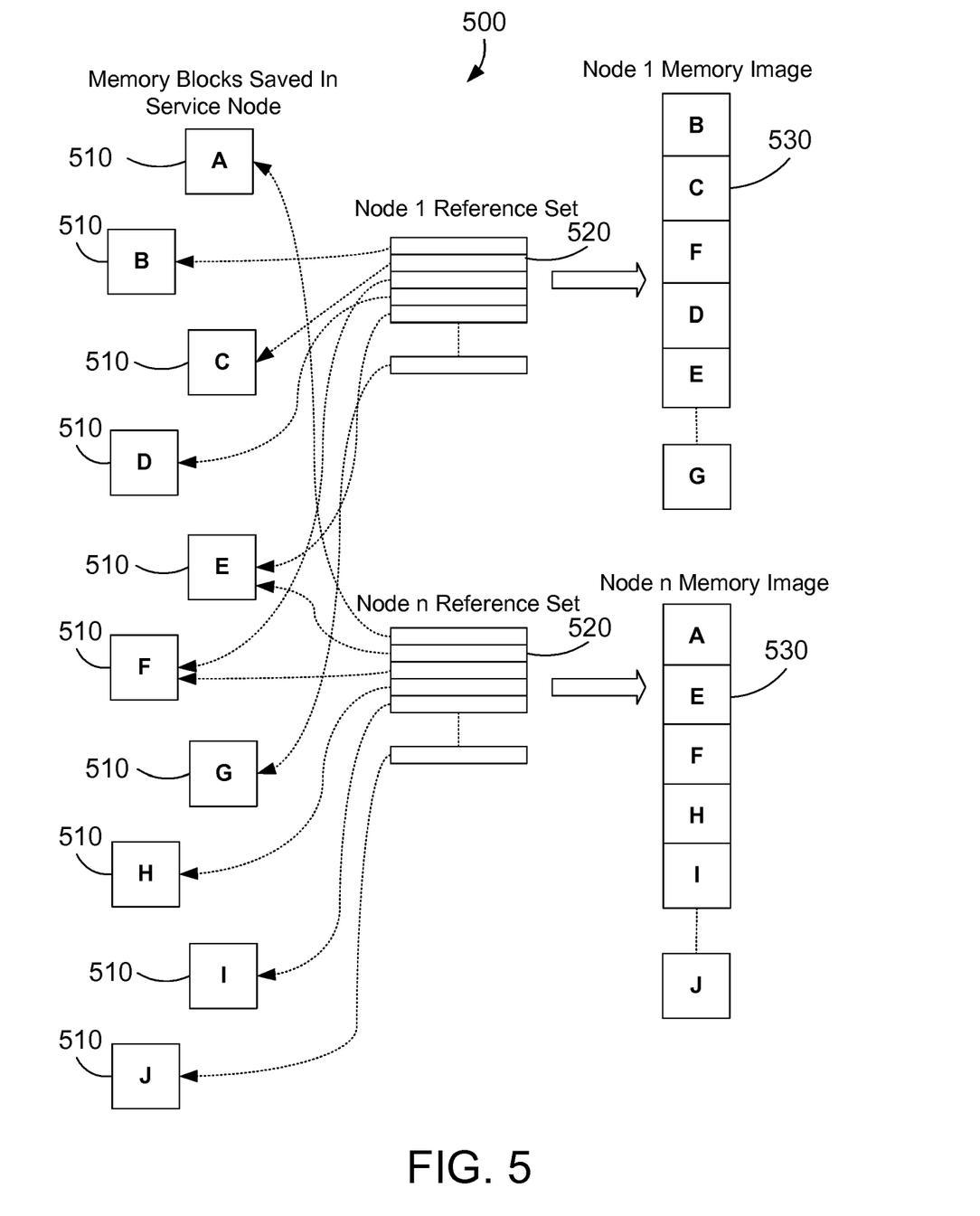
FIG. 5 is a diagram of a parallel debugging data structure showing memory blocks, memory templates and their associated memory images according to a preferred embodiment.

FIG. 5 shows a block diagram of the data structure 500 to show how data can be stored in the debug 144 set described above. The debug data structure 500 includes memory data blocks 510, node reference sets 520 and associated memory images 530 for the nodes according to a preferred embodiment. The memory data blocks 510 are archived on the service node 140 (FIG. 1). Each memory block 510 is preferably unique. The memory blocks 510 shown in FIG. 5 are given an alphabetic identifier (A through J) for illustration and discussion. Each node in the system has a reference set 410 (introduced above with reference to FIG. 4) that serves to identify which of the memory blocks stored in the service node or other nodes make up the memory of the respective node. The reference set for each node holds a list of pointers or numbers in the order of the memory image that point to the memory blocks 510. The node reference set 410 can be used to assemble a memory image 530 for the associated node. The process to create the reference set, the memory blocks and the memory image for use in debugging are described further below.

Figure 6:
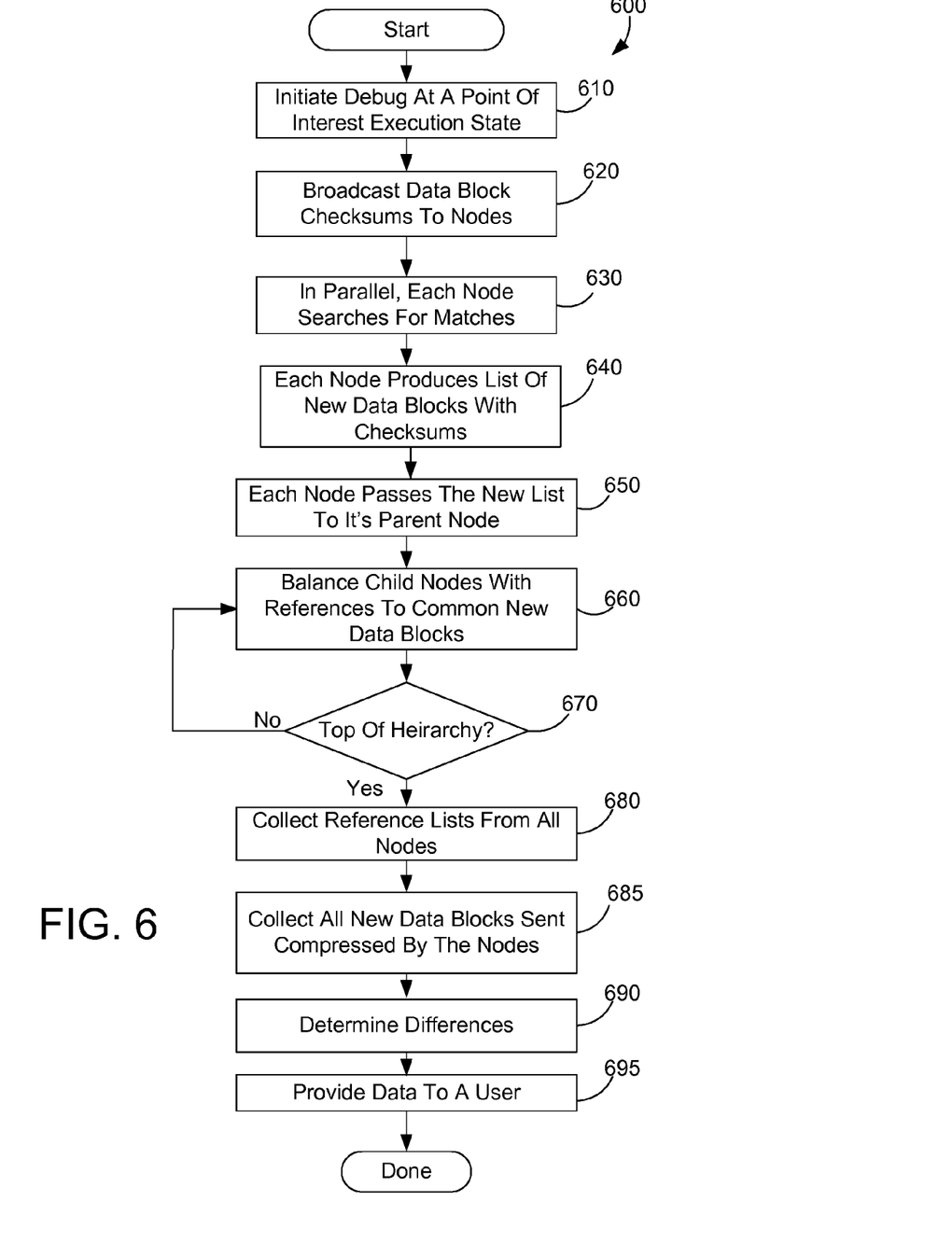
FIG. 6 is a method flow diagram for parallel debugging on a massively parallel computer system according to a preferred embodiment.

FIG. 6 shows a method 600 of parallel debugging according to embodiments herein. The debugger determines to initiate the debug process (step 610) when instructed by the application or by other trigger methods set up by an user to observe the system at the trigger point to debug the system in the manner known in the prior art. Using the trigger point, the debugger initiates the debug at a point of interest execution state. The debugger then broadcasts the template of data block checksums to all compute nodes in the cluster (step 620). The compute nodes then search in parallel their own memory image for checksum matches, preferably using the rsync protocol rolling checksum algorithm (step 630). After each compute node analyzes its own memory image it produces new data blocks with checksums that didn't exist in the data template, and a list of references to the original data blocks in the template (step 640). Each compute node then sends its new data block checksums to its parent node in the hierarchy of nodes (step 650). The Nodes receive the data block checksums from all of its children in the hierarchy and then finds common data blocks between all children as well as its own data blocks, informs the children to replace its reference to common data block with a reference to a data block on another node (step 660). The process is repeated by having this node send the complete checksum template to its parent if the top of the hierarchy has not been reached (step 670=no). Once the top of the hierarchy (service node) is reached (step 670=yes), the debugger will collect reference lists of data blocks from the compute nodes and store them in the service node (step 680). The nodes may send the new data blocks in a compressed format. Next, the debugger asks for the data for the new unique data blocks that were not part of the original debug set from the compute nodes and stores them (step 685). Step 685 may be done in parallel and may also be deferred until the debugger needs to process or present the data. Next, determine differences between the data template with the initial execution state and the point of interest execution state (step 690) and then provide data of the determined differences in to an system user to assist in debugging a failure of the parallel computer system (step 695). The method of debugging is then complete. The user can then use various tools and methods to analyze the debug data set to determine the cause of failure.

In step 620 above, the debugger broadcasts the list of data block checksums to the nodes at the beginning of the debug process. Alternatively, the nodes could maintain a cache of the checksums from a previous execution state such that a broadcast of the checksums may not be necessary each time. In addition, the debugger could maintain a history of execution states by archiving the node reference lists from previous executions states. This may increase the efficiency of the debugger where the application on the nodes returns to a previous execution state. Further, the archiving of the execution states would allow the debugger to roll back the application state on the nodes to a previous execution state for analysis. Used in this manner, the debugger is functioning similar to a checkpoint system and has some of the same features of a checkpoint system.

The debugger could exploit the commonality in the references lists. The reference list for the nodes could be divided into "references of references" so that a subset of the list can be shared. For example, the reference list for the execution state containing application instructions is unlikely to change between nodes and this subset of the reference list could be shared. If the reference lists are large enough they could be treated as a memory image and the entire debug process repeated over this memory image.

Further, the debugger could take advantage of the commonality of memory between nodes. The debugger could search the node reference lists to see what nodes have the same contents of memory for a given set of variables in the application. This would allow a parallel debugger to present a view of differences between corresponding variables across nodes on a massively parallel architecture like BlueGene. The parallel debugger could invoke this function interactively when it stops the application at a breakpoint so that an application can be debugged interactively "online." The debugger could also only present a subset of the data on the nodes and/or on only a subset of the nodes as controlled by the user to allow the user to focus on a particular area of interest.

Figure 7:
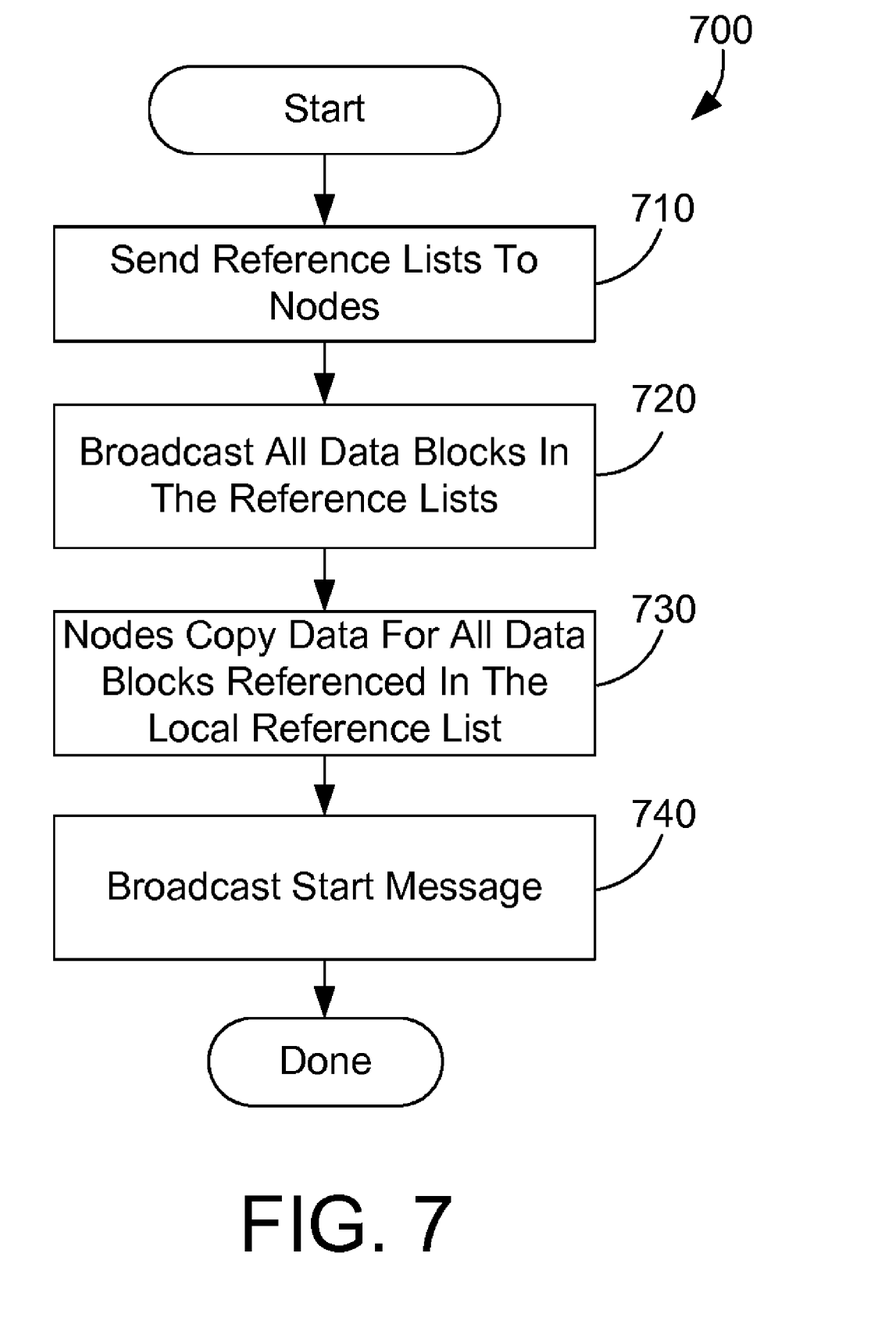
FIG. 7 is a method flow diagram for restarting a massively parallel computer system to roll back the execution state to a previous state according to a preferred embodiment.

FIG. 7 shows a method 700 of restoring the execution state of a parallel computer system according to embodiments herein. This method provides an efficient and scalable roll back capability to restore a previous application state that allows repeated analysis of a portion of an application without the need to restart the application from the beginning. This is a powerful tool for a user debugging software applications and hardware through repeated executions of a controlled subset of the application. The debugger first sends the reference template of the data blocks to each compute node and the compute nodes prepare to receive broadcast data from the debugger (step 710). The debugger then broadcasts data blocks in the reference set to all compute nodes in the cluster (step 720). The compute nodes copy data from the broadcast for checksum that matches its own reference list (step 730). The debugger then broadcasts a message to start the application from the point of the now restored debug state (step 740).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As described above, embodiments provide a method and apparatus for parallel debugging using rsync-based data protocol for a massively parallel computer system. Embodiments herein greatly decrease the amount of data that must be transmitted and stored for debugging and increased efficiency of the computer system to solve the prior art problem of network bandwidth and CPU time needed to determine the state of the system for debugging. This system leverages off of the prior art that used checksum algorithms like rsync to copy a computer file from one machine to another. One skilled in the art will appreciate that many variations are possible within the scope of the claims. Thus, while the disclosure has been particularly shown and described above, it will be understood by those skilled in the art that these and other changes in form and details may be made therein without departing from the spirit and scope of the claims.

The invention claimed is:

1. A computer implemented method for debugging a parallel computer system comprising the steps of:
   a) initiating debugging at a point of interest execution state;
   b) broadcasting a data template with data block checksums of an initial execution state to all compute nodes arranged in a cluster;
   c) each compute node searching its own memory image for checksum matches;
   d) producing a template of new data blocks with checksums that didn't exist previously;
   e) producing reference lists to original data blocks that did exist in the previous checkpoint;
   f) collecting the reference lists from the compute nodes;
   g) collecting new unique data blocks from the nodes and storing them;
   h) determining differences between the data template with the initial execution state and the point of interest execution state; and
   i) providing data of the determined differences in step h to a system user to assist in debugging the parallel computer system.

2. The computer implemented method of claim 1 wherein the steps of each compute node searching its own memory image for checksum matches uses an rsync protocol in a rolling checksum algorithm.

3. The computer implemented method of claim 1 further comprising each node performing the steps of:
   j) sending its new data block checksum template to an adjacent node in the cluster of nodes;
   k) comparing checksums to find common data blocks between all adjacent nodes as well as its own data blocks; and
   l) informing adjacent nodes to replace a reference to a common data block with a reference to a data block on another node.

4. The computer implemented method of claim 1 wherein the step of collecting new unique data blocks and storing them stores the data on auxiliary data storage servers instead of the debugger.

5. The computer implemented method of claim 1 further comprising the step of:
   m) prior to step a), restoring a previous application state of an application to allow a user to debug a failure on the parallel computer system through repeated executions of a controlled subset of the application.

6. The computer implemented method of claim 5 wherein the step of restoring the previous application state further comprises the steps of:
   1) sending the reference lists to the nodes;
   2) broadcasting all data blocks in the reference lists;
   3) for all the nodes, copying data for all blocks referenced in a local reference list; and
   4) broadcasting a start message.

7. The computer implemented method of claim 1 wherein the step of providing data to a system user further comprises limiting the data to a subset of the data on the nodes.

8. The computer implemented method of claim 1 wherein the step of providing data to a system user further comprises limiting the data to a subset of the data on a subset of the nodes.

9. The computer implemented method of claim 1 wherein the step of collecting new unique data blocks and storing them is deferred until the data is needed by the debugger.

10. An article of manufacture comprising:
A) a debugger for debugging a parallel computer system when executed by a computer performs the steps of:
   a) determining to initiate debugging at a point of interest execution state;
   b) broadcasting a data template with data block checksums of an initial execution state to all compute nodes arranged in a cluster;
   c) each compute node searching its own memory image for checksum matches;
   d) producing a template of new data blocks with checksums that didn't exist previously; and
   e) producing reference lists to original data blocks that did exist in the previous checkpoint;
   f) collecting reference templates from the compute nodes;
   g) collecting new unique data blocks and storing them;
   h) determining differences between the data template with the initial execution state and the point of interest execution state;
   i) providing data of the determined differences in step h to a system user to assist in debugging a failure of the parallel computer system; and
B) non-transitory computer recordable media bearing the debugger.

11. The article of manufacture of claim 10 wherein the steps of each compute node searching its own memory image for checksum matches uses an rsync protocol in a rolling checksum algorithm.

12. The article of manufacture of claim 11 further comprising each node performing the steps of:
   j) sending its new data block checksum template to an adjacent node in the cluster of nodes;
   k) comparing checksums to find common data blocks between all adjacent nodes as well as its own data blocks; and
   l) informing adjacent nodes to replace a reference to a common data block with a reference to a data block on another node.

13. The article of manufacture of claim 10 wherein the step of collecting new unique data blocks and storing them stores the data on auxiliary data storage servers instead of the debugger.

14. The article of manufacture of claim 10 further comprising the step of:
   m) prior to step a), restoring a previous application of an application state to allow a user to debug a failure on the parallel computer system through repeated executions of a controlled subset of a total execution of the application.

15. The article of manufacture of claim 14 wherein the step of restoring a previous application state further comprises the steps of:
   1) sending the reference lists to the nodes;
   2) broadcasting all data blocks in the reference lists;
   3) for all the nodes, copying data for all blocks referenced in a local reference list; and
   4) broadcasting a start message.

16. The article of manufacture of claim 10 wherein the step of providing data to a system user further comprises limiting the data to a subset of the data on the nodes.

17. A parallel computer system comprising:
A) a plurality of compute nodes connected by one or more networks;
B) a service node connected to the plurality of compute nodes;
C) a debugger for debugging the parallel computer system that performs the steps of:
   a) determining to initiate debugging at a point of interest execution state;
   b) broadcasting a data template with data block checksums of an initial execution state to all compute nodes arranged in a cluster;
   c) each compute node searching its own memory image for checksum matches using an rsync protocol in a rolling checksum algorithm;
   d) producing a template of new data blocks with checksums that didn't exist previously; and
   e) producing reference lists to original data blocks that did exist in the previous checkpoint;
   f) collecting reference templates from the compute nodes;
   g) collecting new unique data blocks and storing them;
   h) determining differences between the data template with the initial execution state and the point of interest execution state; and
   i) providing data of the determined differences in step h to a system user to assist in debugging a failure of the parallel computer system.

18. The parallel computer system of claim 17 further comprising each node performing the steps of:
   j) sending its new data block checksum template to an adjacent node in the cluster of nodes;
   k) comparing checksums to find common data blocks between all adjacent nodes as well as its own data blocks; and
   l) informing adjacent nodes to replace a reference to a common data block with a reference to a data block on another node.

19. The parallel computer system of claim 17 further comprising the step of:
   m) prior to step a), restoring a previous application state of an application to allow a user to debug a failure on the parallel computer system through repeated executions of a controlled subset of a total execution of the application.

20. The parallel computer system of claim 19 wherein the step of restoring a previous application state further comprises the steps of:
   1) sending the reference lists to the nodes;
   2) broadcasting all data blocks in the reference lists;
   3) for all the nodes, copying data for all blocks referenced in a local reference list; and
   4) broadcasting a start message.

* * * * *